TELEVISION RECEIVER

Filed Feb. 25, 1963

INVENTORS
Robert B. Hansen
Anil M. Sethna
BY
Mueller & Aichele
Attys.

United States Patent Office 3,240,873
Patented Mar. 15, 1966

3,240,873
TELEVISION RECEIVER

Robert B. Hansen, Arlington Heights, and Anil M. Sethna, Chicago, Ill., assignors to Motorola, Inc., Chicago, Ill., a corporation of Illinois
Filed Feb. 25, 1963, Ser. No. 260,802
4 Claims. (Cl. 178—7.3)

Figure 1:
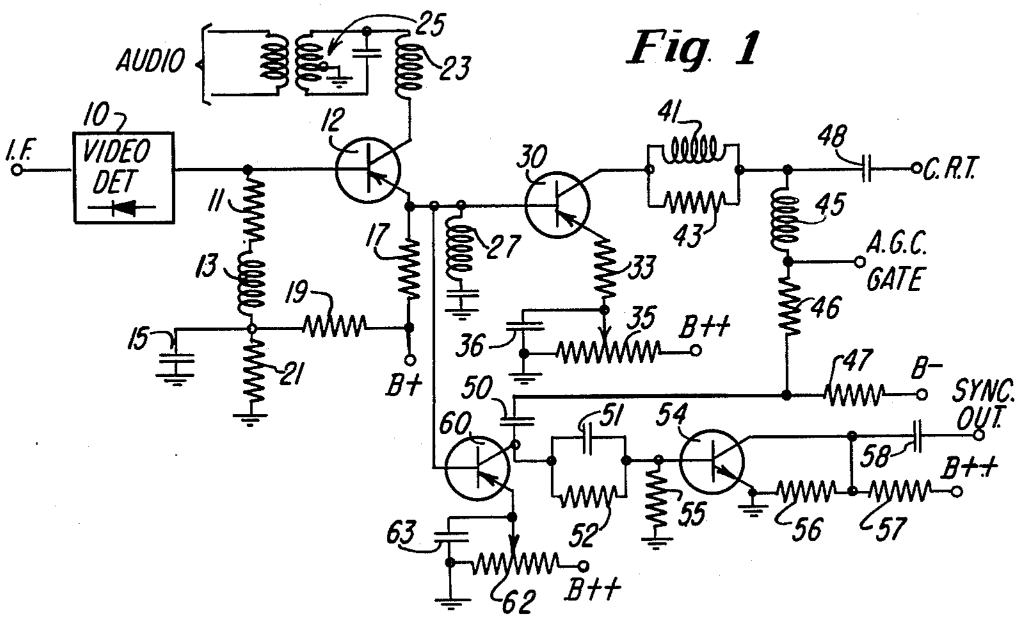

This invention relates generally to transistorized television receivers and more particularly to improvements in the synchronizing signal separator circuits used therein to make them immune to the adverse effects of high level impulse noise.

Television signals are transmitted as a composite of video information signals, which are modulated between minimum and maximum limits, and synchronizing signals of an amplitude exceeding the maximum level of video information signals. It is conventional practice to provide a synchronizing signal separator circuit to derive synchronizing pulses from the detected composite video signal for synchronizing the horizontal and vertical sweep circuits associated with the cathode ray tube of the receiver. In a transistorized television receiver the synchronizing signal separator circuit takes the form of an amplitude limiting transistor having a self-biasing network for coupling detected composite video signals to its input electrode so that the synchronizing signal separator transistor is periodically driven into saturated conduction by the synchronizing signal component of the detected composite video signal, with the self-biasing network retaining a charge to maintain the synchronizing signal separator transistor at cutoff during intervals between individual synchronizing signals when video information signals are present.

Although noise is somewhat compressed by detection and subsequent video amplification, and although the saturated conduction of the synchronizing signal separator transistor provides some degree of noise clipping, the synchronizing signal component of the detected composite video signal may still be accompanied by noise impulses which contain sufficient energy to excessively charge the input self-biasing network. In such instances the synchronizing signal separator transistor is held cut-off during the reception of one or more subsequently received synchronizing pulses and synchronization is lost. And although in television receivers utilizing vacuum tubes various circuits have been proposed to cancel impulse noise from the input of the synchronizing signal separator tube or to disable the synchronizing signal separator tube in the presence of individual synchronizing pulses accompanied by impulse noise exceeding a predetermined level, operating voltage levels, impedances, and signal polarity have resulted in somewhat unsatisfactory performance when adapting such circuits for use in transistorized receivers.

It is therefore among the objects of the invention to provide an improved synchronizing signal separator circuit for use with transistorized television receivers.

Another object is to provide a synchronizing signal separator circuit for transistorized television receivers in which a self-bias network thereof is prevented from paralyzing the circuit in the presence of high level impulse noise.

A further object of the invention is to provide a noise immune transistorized synchronizing signal separator circuit for television receivers which is simple in construction and which provides reliable operation over a wide range of incoming signal strength.

A feature of the present invention is the provision of transistor means to introduce a low impedance path to ground or other suitable reference for the series input capacitor of the self-biasing network of a synchronizing signal separator circuit to reduce the time constant thereof in the presence of noise impulses exceeding a predetermined level.

Another feature is the provision of a semiconductor switching device responsive to high level noise impulses to present a low impedance shunt path which prevents excessive noise charge-up of the self-biasing RC network of a transistorized synchronizing signal separator circuit in television receivers.

A further feature is the provision, in a circuit of the above-described type, of circuit means whereby the threshold level of the input of the noise responsive switching transistor closely follows the level of the detected composite video signal so that noise charge-up of the synchronizing signal separator circuit may be prevented over a wide range of signal levels.

Figure 2:
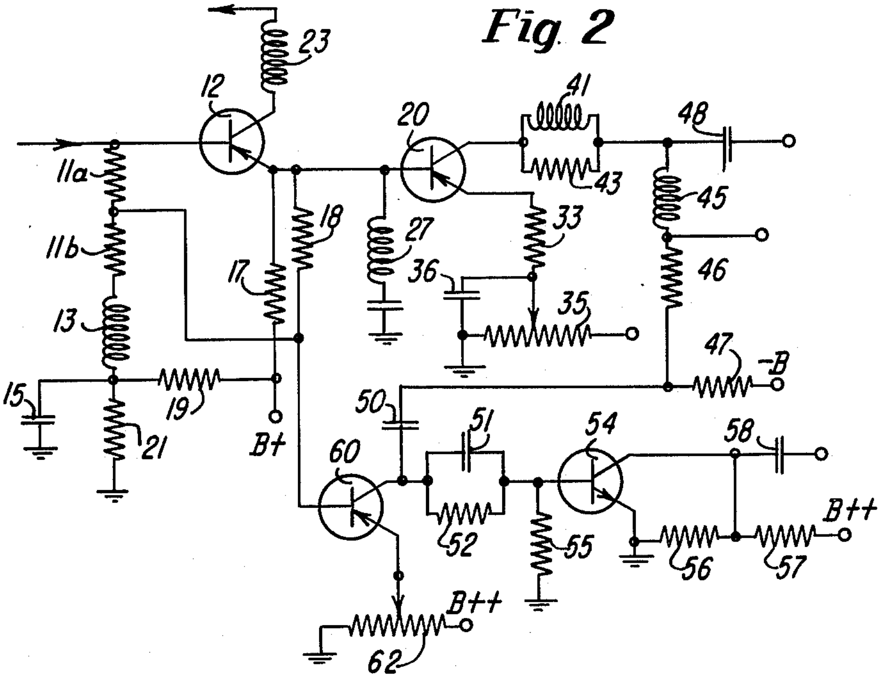

Other objects, features and attending advantages of the invention will become apparent from the following description when taken in conjunction with the accompanying drawings, in which:

FIG. 1 is a schematic representation of one form of the invention as utilized in a transistorized television receiver; and FIG. 2 illustrates another form of the invention.

In practicing the invention there is provided a synchronizing signal separator transistor having an input electrode thereof coupled to the video stages of a television receiver by a self-biasing circuit which includes a series capacitor. There is further provided a relatively high valued resistor shunting the input electrode of the synchronizing signal separator transistor to a reference potential such as ground. This arrangement provides self-biasing for the synchronizing signal separator transistor so that it will conduct in the presence of the synchronizing signal portion of the detected composite video signal. The series input capacitor is charged during conduction of the synchronizing signal separator transistor and is subsequently discharged through the input shunting resistor to provide a reverse bias which retains the transistor cutoff during intervals when video information signals are received. The time constant between the series input capacitor and the input shunting resistor are such that the synchronizing signal separator transistor is allowed to conduct only upon the reception of signals exceeding the maximum modulation level of video information signals.

Noise impulses of the same polarity which accompany individual synchronizing pulses may cause the series capacitor of the self-biasing network of the synchronizing signal separator circuit to be excessively charged so that in conjunction with the input shunting resistor the reverse bias is such that the transistor may be held cutoff for excessive periods of time, and synchronization is lost. To alleviate this effect, a switching transistor is connected to the input electrode of the synchronizing signal separator transistor such that the collector-to-emitter path provides a low impedance shunt path to a reference potential in the presence of high level impulse noise. The switching transistor is normally biased to cutoff and its input electrode is coupled to a video stage of the receiver. In the absence of impulse noise of a predetermined level detected composite video signal supplied to its input electrode does not change the conductive state of the switching transistor. However, in the presence of high level noise impulses the switching transistor is rendered conductive to provide a relatively low impedance shunt path for the input time constant network of the synchronizing signal separator circuit. This prevents excessive noise charge-up of the series capacitor thereof and thus the synchronizing signal separator circuit is not disabled in the presence of high level noise impulses that would ordinarily result in loss of synchronization.

Referring now to FIG. 1, received television signals derived from the intermediate frequency stages of the receiver are coupled to video detector 10 to provide a detected composite video signal at the input of first video amplifier transistor 12. Resistor 11, series connected with peaking coil 13 and bypass capacitor 15 between the base electrode of transistor 12 and ground reference potential provides a load for detector 10, across which the composite video signal is developed. Emitter bias for transistor 12 is supplied through resistor 17 from a positive source. The voltage division arrangement of resistors 19 and 21, connected between the same positive source which supplies emitter bias and ground reference potential provides base bias to establish the quiescent operating point of transistor 12.

The collector electrode of transistor 12 is connected through coil 23 to a tuned circuit shown generally at 25. This circuit arrangement provides parallel resonance for the audio subcarrier of the received television signal while at the same time provides a low series impedance path to ground for the detected composite video signal. The series resonant circuit shown at 27, connected between the emitter electrode of transistor 12 and ground reference potential is tuned to provide a low impedance path to ground for the audio subcarrier and a high impedance to the detected composite signal. Thus, it can be seen that transistor 12 operates as a common emitter amplifier for the audio subcarrier and as a common collector amplifier for the detected composite video signal. As such, with a negative going detected composite video signal supplied by detector 10 across resistor 11 at the input of transistor 12, a negative going composite video signal will also be applied across the emitter resistor 17 of transistor 12.

The emitter electrode of transistor 12 is directly connected to the input base electrode of second video amplifier transistor 30. Because of this direct connection base bias for transistor 30 is provided by the same source as emitter bias for transistor 12. Emitter bias for transistor 30 may be provided through a circuit arrangement including resistor 33, potentiometer 35 and bypass capacitor 36. Resistor 33 is series connected between the emitter electrode of transistor 30 and a tap point on potentiometer 35. The ends of potentiometer 35 are in turn connected between a source of positive potential and ground reference potential. Adjustment of the tap point of potentiometer 35 provides a contrast control for the receiver, while capacitor 36 provides a bypass to prevent undue degeneration. To provide the quiescent operating point for transistor 30 the positive supply for its emitter electrode is somewhat higher than the positive supply which commonly supplies its base electrode and the emitter electrode of transistor 12.

The collector electrode of transistor 30 is connected through the parallel combination of coil 41 and resistor 43, in series with peaking coil 45 and load resistors 46 and 47, to a source of negative potential. In order to provide sufficient drive for the cathode ray tube of the receiver, this potential may be in the order of —100 volts or more, and as is conventional practice may be derived from a rectifier circuit associated with the horizontal sweep circuit of the receiver. The amplified composite video signal is coupled by capacitor 48 to the cathode electrode of the cathode ray tube of the receiver. It can be seen that with a negative going detected composite video signal supplied to the base electrode of transistor 30, which is connected in the common emitter configuration, the amplified composite video signal appearing at its collector electrode is a positive going signal.

The composite video signal amplified by transistor 30, as derived at the junction point between resistors 46 annd 47, is further coupled through capacitor 50 and the parallel RC network including capacitor 51 and resistor 52 to the base electrode of synchronizing signal separator transistor 54. Resistor 55 further connects the base electrode of transistor 54 to ground reference potential. The collector electrode of transistor 54 is also connected to ground reference potential by resistor 56. For an NPN transistor as shown for transistor 54, positive going synchronizing signals coupled by capacitor 50 to its base electrode drive it into saturated conduction to develop an output signal across resistor 56. Capacitor 58 couples this output signal to a phase inverter circuit for distribution to the horizontal and vertical sweep circuits of the receiver. At the end of each synchronizing signal a charge is retained by capacitor 50 and is subsequently discharged through resistor 55 to ground reference potential to provide a reverse bias to maintain transistor 54 cutoff. The time constant provided between capacitor 50 and resistor 55 is such that transistor 54 remains cutoff during reception of video information signals and will be rendered conductive only by positive going signals coupled to its base electrode which exceeds the maximum modulation level of the video information signals, as occurs when synchronizing signals are present in the composite video signal. The RC network of capacitor 51 and resistor 52 provide differentiation for long time constant noise impulses to decrease their effect on the output of transistor 54.

Transistor 60, shown as a PNP transistor, has its collector electrode connected to the junction point of capacitor 50 and the RC network of capacitor 51 and resistor 52. The value of resistor 52 is small with respect to resistor 55 so that this point is effectively at the same potential as the base electrode of transistor 54 with respect to ground reference. Alternately the collector electrode of transistor 60 may be connected directly to the base electrode of transistor 54. Emitter bias for transistor 60 is provided by connection to the tap point on potentiometer 62, which provides a voltage divider between a source of positive potential and ground reference potential. The base electrode of transistor 60 is directly connected to the emitter electrode of transistor 12 which, as previously mentioned, is provided with a biasing potential from a positive source through resistor 17.

As previously noted, a negative going composite video signal appears at the emitter electrode of transistor 12. The emitter bias of transistor 60 is set by adjustment of the tap point of potentiometer 62 so that transistor 60 remains cutoff in the presence of negative going synchronizing signals unaccompanied by noise impulses which exceed their maximum level at its base electrode. Capacitor 63 provides a bypass to hold the emitter electrode of transistor 60 at ground reference potential with respect to the composite video signal so that the base-to-emitter bias providing cutoff for transistor 60 follows or tracks the level of the synchronizing signals appearing at the emitter electrode of transistor 12. This insures that the cutoff or noise threshold bias for transistor 60 remains the same for variations in the strength of the detected composite video signal.

When the negative going synchronizing signals applied to the base electrode of transistor 60 are accompanied by noise impulses which exceed their maximum level the base-to-emitter or noise threshold bias transistor 60 is overcome and it tends to conduct, becoming increasingly conductive with increased noise level until it is driven into saturation. There is provided therefore a low impedance path through the collector-to-emitter junction of transistor 60 and a portion of potentiometer 62 to ground reference potential when high level noise impulses are present. This effectively shunts the resistor 55 with a low impedance so that capacitor 50 is prevented from maintaining a charge in excess of that provided by the maximum level of synchronizing signal component of the composite video signal coupled through it from transistor 30. At the end of the noise impulse transistor 60 immediately returns to its normally cutoff state so that the low impedance path in shunt with resistor 55 is removed and the self-biasing network of transistor 54 operates in the normal manner.

An embodiment of the invention wherein bypass capacitor 63 for the emitter electrode of transistor 60 may be eliminated is shown in FIG. 2, wherein like circuit elements bear like reference numerals. The load resistance for the detected diode 10 is split into two portions, resistors **11*a* and 11*b*, and the input to the base electrode of transistor 60 is connected to the common point therebetween. Thus the negative going composite video signal developed across resistor 11*b* supplies the input for transistor 60. Resistor 18 is further connected between the base electrode of transistor 60 and the emitter electrode of transistor 12. This allows a portion of the video output of transistor 12 to be supplied to the base electrode of transistor 60 in a degenerative manner so that the voltage appearing at its base electrode remains substantially constant for varying signal levels of the detected composite video signal, and the base-to-emitter bias or noise threshold voltage of transistor 60 is allowed to follow or track incoming signal strength without readjustment of the emitter bias for transistor 60**.

For best results the value of potentiometer 62 should be small with respect to resistor 55. In addition, for a given time constant it is desirable to make resistor 55 as large as possible consistent with a value of capacitor 50 which will couple the composite video signal to the base electrode of transistor 54. This provides a short discharge time constant when transistor 60 tends to conduct for faster response. In a particularly successful circuit, wherein PNP transistors were used in the video stages of the television receiver, the following circuit values were employed:

| | | |
|---|---|---|
| B+ | volts | 13 |
| B++ | do | 18 |
| B— | do | 100 |
| Resistor **11** | ohms | 5600 |
| Resistor **17** | do | 560 |
| Resistor **19** | do | 220 |
| Resistor **21** | do | 1,000 |
| Capacitor **50** | microfarad | 0.05 |
| Transistor **54** | (Motorola) | 4464 |
| Resistor **55** | ohms | 330,000 |
| Transistor **60** | (Motorola) | 4478 |
| Potentiometer **62** | ohms | 500 |
| Capacitor **63** | microfarads | 2 |

In the modified circuit of FIG. 2 the following changes may be made:

| | | |
|---|---|---|
| Resistor **11*a*** | ohms | 4700 |
| Resistor **11*b*** | do | 1000 |
| Resistor **18** | do | 2700 |

It should be apparent that although the present invention has been set forth with particularity certain modifications may be made by those skilled in the art. For example, the video stages of the receiver utilizing the improved synchronizing separator circuit of the invention may contain NPN transistors as video amplifiers. In such an instance the base electrode of transistor 60, and capacitor 50 of the self-biasing network for transistor 54 may be coupled to points where respective negative going and positive going detected composite video signals may be obtained to provide operation in the manner discussed. In addition, with proper polarity biasing and a composite video signal swing in the proper direction transistors 54 and 60 may be of opposite conductivity type to that shown.

The invention provides therefore an improved synchronizing signal separator circuit for transistorized television receivers, which circuit is immune to the adverse affects of high level impulse noise. The circuit is simple in construction, requiring a minimum of circuit elements, and provides reliable operation over a wide range of incoming signal strength.

We claim:

1. In a television receiver, a noise immune synchronizing signal separator circuit including in combination, signal amplification means for amplifying received television signals, a first semiconductor device having input, output and common electrodes, circuit means including a capacitor series connected between the input electrode of said first semiconductor device and said signal amplification means to derive a composite video signal therefrom of a given polarity, a resistor connecting the input electrode of said first semiconductor device to a reference potential, with said capacitor and said resistor providing a self-biasing network to allow saturated conduction of said first semiconductor device by the synchronizing signal component of said composite video signal and having a time constant to bias said first semiconductor device to a state of non-conduction during the video signal component of said composite video signal, means connected between the output and common electrodes of said first semiconductor device to supply synchronizing pulses in response to conduction thereof, a second semiconductor device having input, output, and control electrodes, means for direct current connection of the input electrode of said second semiconductor device to said signal amplification means to derive a composite video signal of a polarity opposite to said given polarity therefrom, means connecting the common electrode of said second semiconductor device to said reference potential, biasing means connected to the common electrode of said second semiconductor device to bias same to a state of non-conduction in the presence of composite video signals unaccompanied by high level noise impulses supplied to the base electrode thereof, with said second semiconductor device becoming conductive in the presence of noise impulses exceeding the maximum level of the synchronizing signal component of said composite video signal, and means connecting the output electrode of said second semiconductor device to the junction of said input electrode of said first semiconductor device with said capacitor, whereby said second semiconductor device provides a low impedance path to said reference potential for high level noise impulses to prevent noise charge-up of said series capacitor.

2. A noise immune synchronizing signal separator circuit for a television receiver including in combination, first transistor means having input, output and common electrodes, circuit means including a capacitor series connected between the input electrode of said first transistor means and the video frequency amplifier of said receiver to derive a composite video signal therefrom of a given polarity, said first transistor being responsive to said composite signal to draw current through said capacitor, a resistor connecting the input electrode of said first transistor means to ground reference potential, means connecting the common electrode of said first transistor means to ground reference potential, with said capacitor and said resistor providing a self-biasing network to allow saturated conduction of said first transistor means by the synchronizing signal component of said composite video signal and having a time constant to bias said first transistor means to a state of non-conduction during the video component of said composite video signal, means connected between the output and common electrodes of said first transistor means to provide synchronizing pulses in response to conduction thereof, a second transistor means having input, output and common electrodes, means for direct current connection of the input electrode of said second transistor means to the video frequency amplifier of said receiver to derive a composite video signal of a polarity opposite to said given polarity therefrom, a potentiometer having first and second terminals and a variable tap point, means for connecting the first and second terminals of said potentiometer between a source of biasing potential and ground reference potential, means connecting the tap point of said potentiometer to the common electrode of said second transistor means, with said second transistor means being biased to a state of non-conduction in the presence of composite video signals unaccompanied by high level impulse noise supplied to the input electrode thereof, and with said second transistor means becoming conductive in the presence of noise impulses exceeding the maximum level of the synchronizing signal component of said composite video signal, and means connecting the output electrode of said second transistor means to the junction of said input electrode of said first transistor means with said capacitor, whereby said second transistor means provides a low impedance path to ground reference potential for high level noise impulses to prevent noise charge-up of said series capacitor.

3. In a television receiver having means for providing a detected composite video signal and amplification means for translating said composite video signal, a noise immune synchronizing signal separator circuit including in combination, first transistor having base, collector and emitter electrodes, circuit means including series capacitor connected between the base electrode of said first transistor and a terminal on said video amplification means to derive a composite video signal of a given polarity therefrom, said first transistor being responsive to said composite signal to draw current through said capacitor, a resistor connecting the base electrode of said first transistor to a reference potential, means connecting the emitter electrode of said first transistor to said reference potential, with said capacitor and said resistor providing a self-biasing network to allow saturated conduction of said first transistor by the synchronizing signal component of said composite video signal and having a time constant to bias said first transistor to a state of non-conduction during the video component of said composite video signal, means connected between the collector and emitter electrodes of said first transistor to provide synchronizing pulses in response to conduction thereof, a second transistor having base, collector and emitter electrodes, means for direct current connection of the base electrode of said second transistor to a further terminal on said video amplification means to derive a composite video signal of a polarity opposite to said given polarity therefrom, a potentiometer having first and second terminals and a variable tap point, means for connecting the first and second terminals of said potentiometer between a source of biasing potential and said reference potential, means connecting the tap point of said potentiometer to the emitter electrode of said second transistor, a bypass capacitor connecting the emitter electrode of said second transistor to said reference potential, with said second transistor being biased to a state of non-conduction in the presence of composite video signals unaccompanied by high level impulse noise supplied to the base electrode thereof, and with said second transistor becoming conductive in the presence of impulse noise exceeding the maximum level of the synchronizing signal component of said composite video signal, and means connecting the collector electrode of said second transistor to the junction of said base electrode of said first transistor with said capacitor, whereby said second transistor provides a low impedance collector-to-emitter path to said reference potential to prevent noise charge-up of said series capacitor by high level noise impulses.

4. In a television receiver subject to receive composite video signals accompanied by noise pulses with amplitudes greater than the amplitude of the composite video signals, the combination including a synchronizing signal separator circuit having a first semiconductor device with input and output electrodes, a source of composite video signals, a capacitor connected between said source and said input electrode and coupling said composite signal to said first semiconductor device, said semiconductor device being responsive to said composite signal to charge said capacitor for biasing said first semiconductor device to amplitude separate the synchronizing signals from said composite signal, a second semiconductor device and means to apply the composite signal thereto, coupling means coupling said second semiconductor device between the junction of said capacitor with said input electrode and ground reference potential, bias means for biasing said second semiconductor device with respect to a given noise threshold so that noise impulses exceeding said noise threshold bias cause said semiconductor device valve to conduct to provide a current path from said input electrode of said first semiconductor device to ground reference potential and to reduce the tendency for charge-up of said capacitor.

References Cited by the Examiner

UNITED STATES PATENTS

| | | | |
|---|---|---|---|
| 2,803,700 | 8/1957 | Kroger | 178—6 |

OTHER REFERENCES

"Noise Cancellation Circuit" RCA Television Service Tips, vol. VI, issue 9, June 22, 1955.

Curll and Simpson, "Transistor TV Portable" Radio Electronics, August 1959, pp. 46–49, vol. 30.

DAVID G. REDINBAUGH, *Primary Examiner.*